United States Patent
Uematsu et al.

(10) Patent No.: US 8,488,892 B2
(45) Date of Patent: Jul. 16, 2013

(54) IMAGE ENCODER AND CAMERA SYSTEM

(75) Inventors: Ryosuke Uematsu, Osaka (JP);
Masahiro Hojo, Osaka (JP); Masahiro Ogawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/596,743

(22) Filed: Aug. 28, 2012

(65) Prior Publication Data

US 2012/0321208 A1    Dec. 20, 2012

Related U.S. Application Data

(63) Continuation of application No. PCT/JP2011/001332, filed on Mar. 7, 2011.

(30) Foreign Application Priority Data

Mar. 17, 2010    (JP) .................................. 2010-061521

(51) Int. Cl.
*G06K 9/36* (2006.01)

(52) U.S. Cl.
USPC ......................................................... 382/238

(58) Field of Classification Search
USPC .................. 382/232–251; 375/240.01–240.29
See application file for complete search history.

(56) References Cited

U.S. PATENT DOCUMENTS

| | | | | |
|---|---|---|---|---|
| 5,859,668 A * | 1/1999 | Aono et al. | ............... | 375/240.15 |
| 6,088,391 A * | 7/2000 | Auld et al. | ............... | 375/240.15 |
| 6,671,323 B1 * | 12/2003 | Tahara et al. | ............ | 375/240.26 |
| 7,643,559 B2 * | 1/2010 | Kato et al. | ............... | 375/240.23 |
| 7,936,821 B2 * | 5/2011 | Suzuki | ...................... | 375/240.16 |
| 7,978,920 B2 * | 7/2011 | Okazaki et al. | ............... | 382/233 |
| 2005/0117642 A1 * | 6/2005 | Abe et al. | .................. | 375/240.12 |
| 2005/0117645 A1 | 6/2005 | Lin | | |
| 2007/0291131 A1 | 12/2007 | Suzuki et al. | | |

FOREIGN PATENT DOCUMENTS

JP    11-298902 A    10/1999
WO    WO-2005/076629 A1    8/2005

OTHER PUBLICATIONS

International Search Report issued in International Patent Application No. PCT/JP2011/001332 dated Apr. 5, 2011.

* cited by examiner

*Primary Examiner* — Ishrat I Sherali
(74) *Attorney, Agent, or Firm* — McDermott Will & Emery LLP

(57) ABSTRACT

A compression controller is capable of executing prediction mode selection for selecting any one of forward prediction, backward prediction, or bidirectional prediction as a prediction mode used for encoding based on spatial frequencies of an image to be encoded. The compression controller determines whether or not to execute the prediction mode selection based on image mobility information indicating an amount of motion in the image to be encoded.

17 Claims, 10 Drawing Sheets

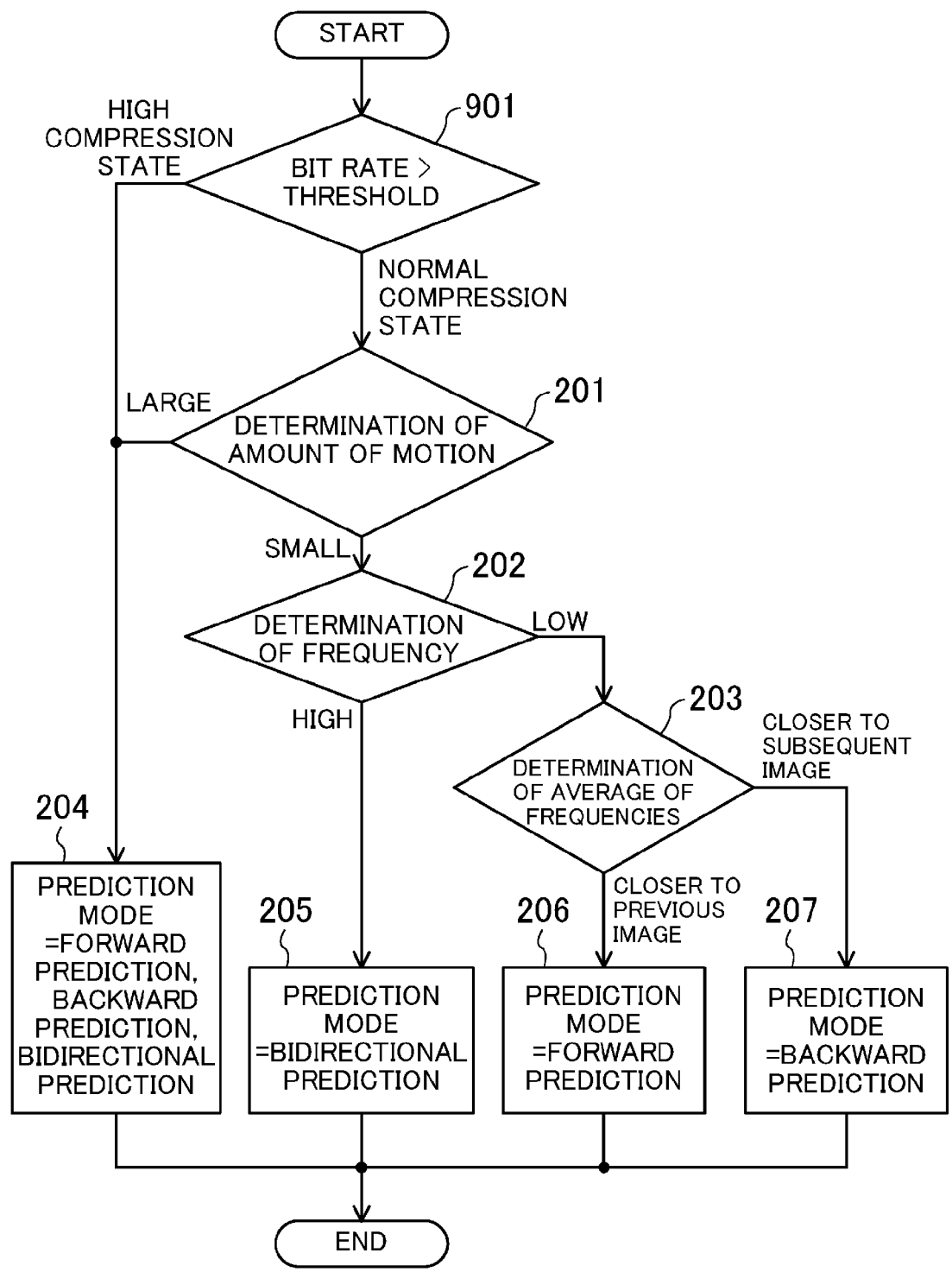

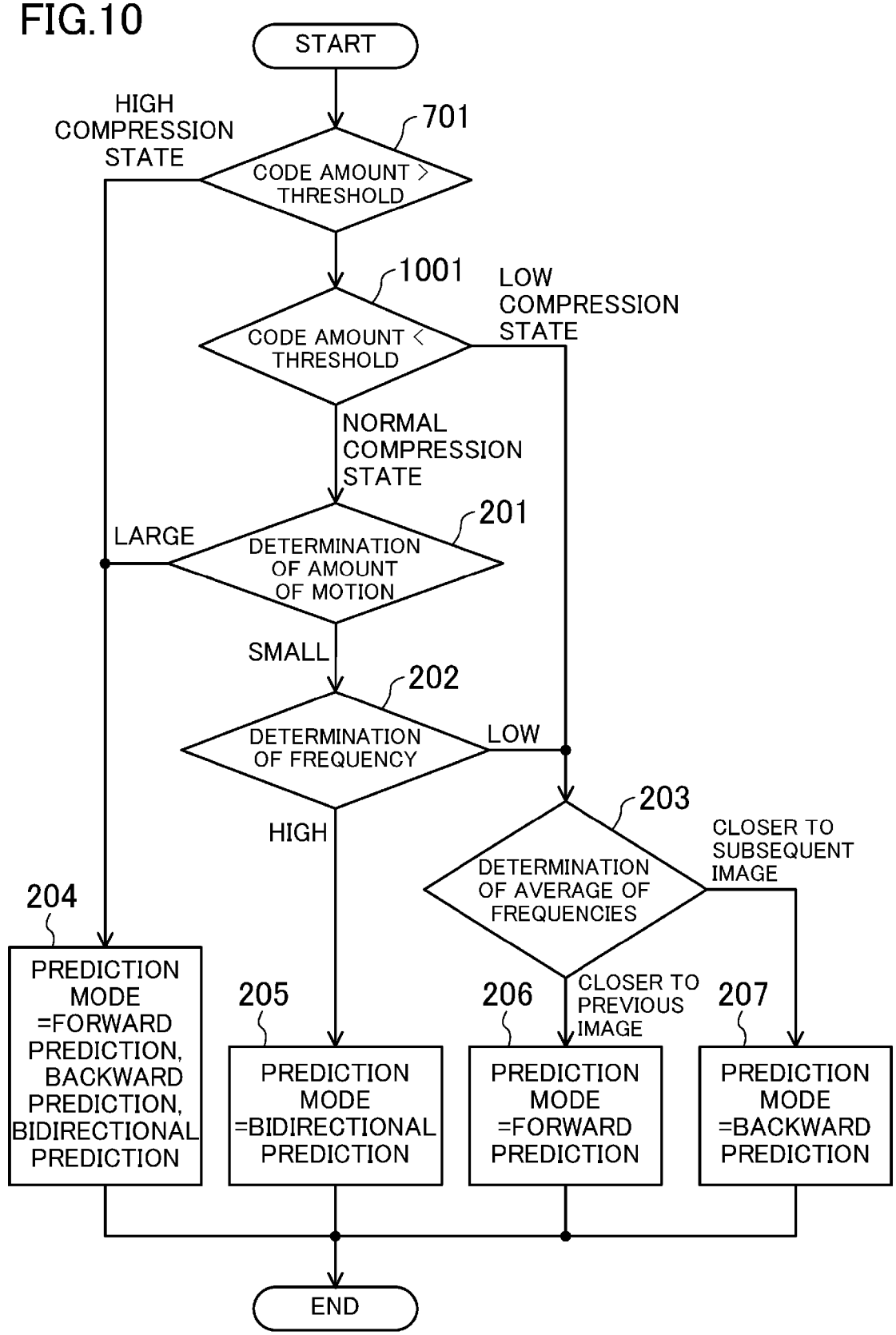

IMAGE ENCODER AND CAMERA SYSTEM

CROSS-REFERENCE TO RELATED APPLICATION

This is a continuation of PCT International Application PCT/JP2011/001332 filed on Mar. 7, 2011, which claims priority to Japanese Patent Application No. 2010-061521 filed on Mar. 17, 2010. The disclosures of these applications including the specifications, the drawings, and the claims are hereby incorporated by reference in their entirety.

BACKGROUND

The present disclosure relates to image encoders encoding moving images, and camera systems including the image encoders.

Conventionally, image encoders are known, which perform intra-frame encoding and inter-frame encoding using a system according to moving picture experts group (MPEG) standards. In recent years, such image encoders have the problem that the power consumption and the processing time required for encoding increase with an increase in an image size for higher image quality. In order to solve the problem, International Patent Publication No. WO 2005/076629 shows an image encoder which selects one of a reference mode using bidirectional encoding, or a reference mode not using bidirectional encoding, in accordance with encoding environment such as settings of resolution, a frame rate, etc. As a result, encoding according to the environment is executed.

SUMMARY

In International Patent Publication No. WO 2005/076629, however, image quality is significantly degraded depending on a captured image, since characteristics of the image is not reflected by the selection of the reference mode.

The present disclosure was made to solve the problem. It is an objective of the present disclosure to reduce deterioration in image quality caused by encoding of a moving image, and to reduce power consumption and processing time required for the encoding.

In order to achieve the objective, an aspect of the present disclosure provides an image encoder encoding a moving image. The encoder includes a compression processor configured to encode brightness data and color-difference data of an image to be encoded, and to output the encoded data; and a compression controller capable of executing prediction mode selection for selecting any one of forward prediction, backward prediction, or bidirectional prediction as a prediction mode used for the encoding based on spatial frequencies of the image to be encoded, and configured to perform scene determination for determining whether or not to execute the prediction mode selection based on image mobility information indicating an amount of motion in the image to be encoded.

According to this aspect, the prediction mode used for the encoding is determined based on the spatial frequencies of the image to be encoded. Therefore, the prediction mode used for the encoding is properly determined to obtain the advantage of reducing deterioration in image quality, power consumption, and processing time required for the encoding.

The present disclosure reduces deterioration in the image quality caused by encoding of a moving image, and reduces the power consumption and the processing time required for the encoding.

BRIEF DESCRIPTION OF THE DRAWINGS

FIG. 9 is a flow chart illustrating the operation of a compression processor and a compression controller according to a second variation of the second embodiment.

FIG. 10 is a flow chart illustrating the operation of a compression processor and a compression controller according to a third embodiment.

DETAILED DESCRIPTION

Figure 1:
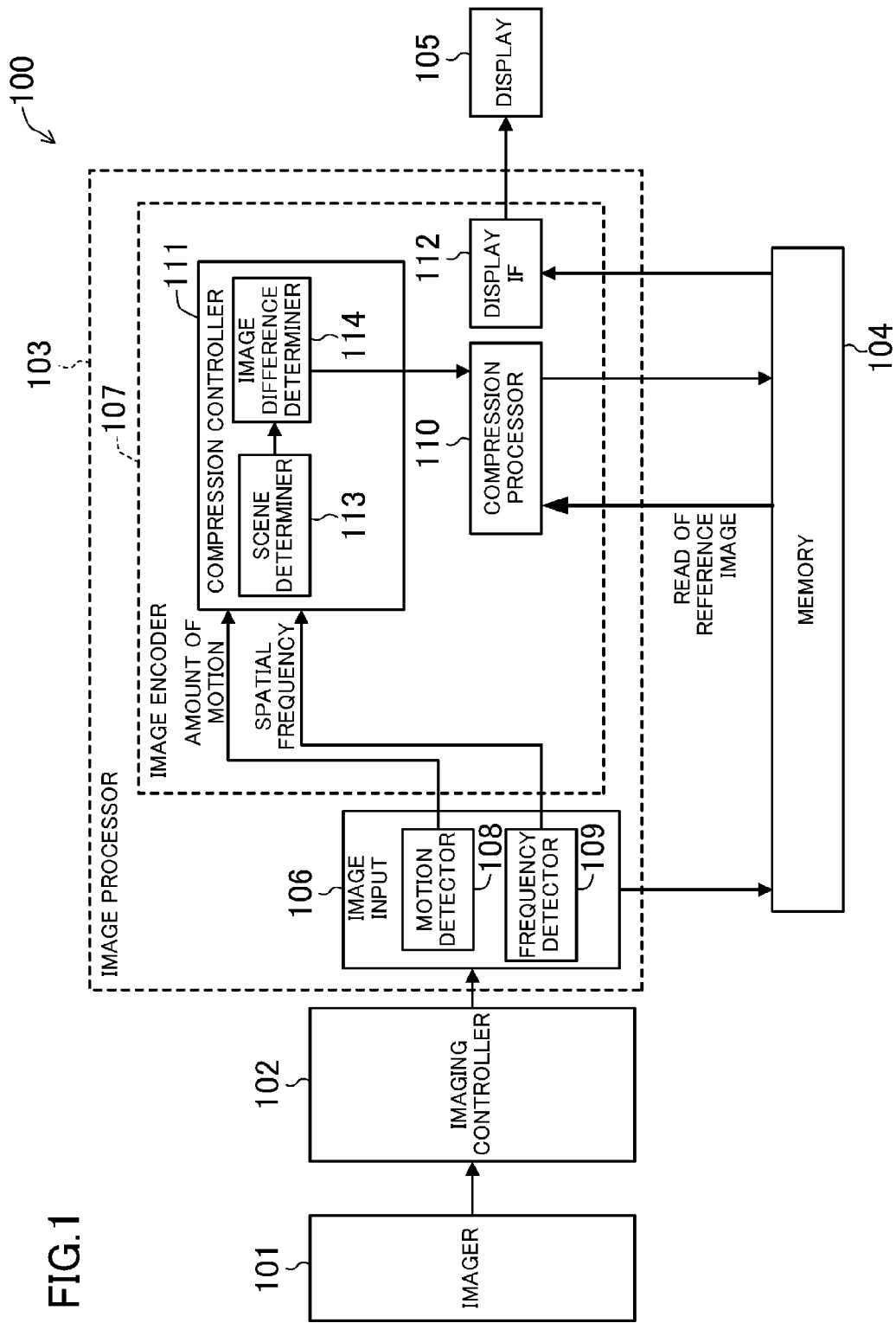
FIG. 1 is a block diagram illustrating the configuration of a camera system according to a first embodiment of the present disclosure.

Embodiments of the present disclosure will be described hereinafter with reference to the drawings. In the following embodiments, the same reference characters as those shown in the other embodiments are used to represent equivalent operation, and the explanation thereof will be omitted.

First Embodiment

A camera system 100 according to a first embodiment of the present disclosure includes, as shown in FIG. 1, an imager 101, an imaging controller 102, an image processor 103, a memory 104, and a display 105. The camera system 100 is, for example, mounted in a network camera, a vehicle camera, a digital video camera, and a digital still camera.

The imager 101 converts image light to an electrical signal using an imaging element.

The imaging controller 102 takes in the electrical signal obtained by the imaging element of the imager 101, performs analog-to-digital conversion of the electrical signal, and outputs a video signal. The imaging controller 102 controls timing of capturing the electrical signal, and time for irradiating the imaging element of the imager 101 with image light.

The image processor 103 includes an image input 106 and an image encoder 107.

The image input 106 performs automatic exposure (AE), white balancing (WB), aperture processing, brightness color-difference signal (YC) processing, and denoising on the video signal output from the imaging controller 102, thereby generating brightness data and color-difference data of an image. The image input 106 includes a motion detector 108 and a frequency detector 109. The motion detector 108 obtains the amount of motion (i.e., image mobility information) using representative matching based on the video signal output from the imaging controller 102. The frequency detector 109 detects spatial frequencies of the image shown by the video signal from a plurality of frequency detection ranges based on the video signal output from the imaging controller 102. The frequency detection ranges are a plurality of divided regions of an image. Each frequency detection range (i.e., divided region) includes a plurality of macro blocks.

The image encoder 107 encodes the brightness data and the color-difference data generated by the image input 106, and outputs the encoded data. Specifically, the image encoder 107 includes a compression processor 110, a compression controller 111, and a display interface (IF) 112.

The compression processor 110 encodes the brightness data and the color-difference data of the image to be encoded, which are generated by the image input 106, and outputs the encoded data. The encoding is performed in a mode according to the MPEG standards. In the encoding, the compression controller 111 controls which of reference images is to be referenced. A motion vector and a code amount are obtained by the encoding.

The compression controller 111 selects the reference image referenced by the compression processor 110 in the encoding based on the amount of motion obtained by the motion detector 108 and the spatial frequencies obtained by the frequency detector 109. Then, the compression controller 111 controls the compression processor 110 to perform the encoding with reference to the selected reference image. The compression controller 111 includes a scene determiner 113 and an image difference determiner 114.

The image difference determiner 114 selects the reference image based on the spatial frequencies of the image to be encoded. That is, the image difference determiner 114 executes prediction mode selection for selecting a prediction mode used for the encoding of the compression processor 110 from forward prediction, backward prediction, and bidirectional prediction based on the spatial frequencies of the image to be encoded.

The scene determiner 113 determines whether or not the prediction mode selection by the image difference determiner 114 is performed on an image compressed as an image encoded in bidirectional prediction (i.e., a picture with reference to a previous frame and a subsequent frame). The determination is made based on the amount of motion obtained by the motion detector 108.

The display IF 112 outputs the brightness data and the color-difference data generated by the image input 106.

The memory 104 temporarily stores the encoded data output from the image encoder 107 of the image processor 103.

The display 105 displays the image based on the brightness data and the color-difference data output from the display IF 112 of the image encoder 107.

Figure 2:
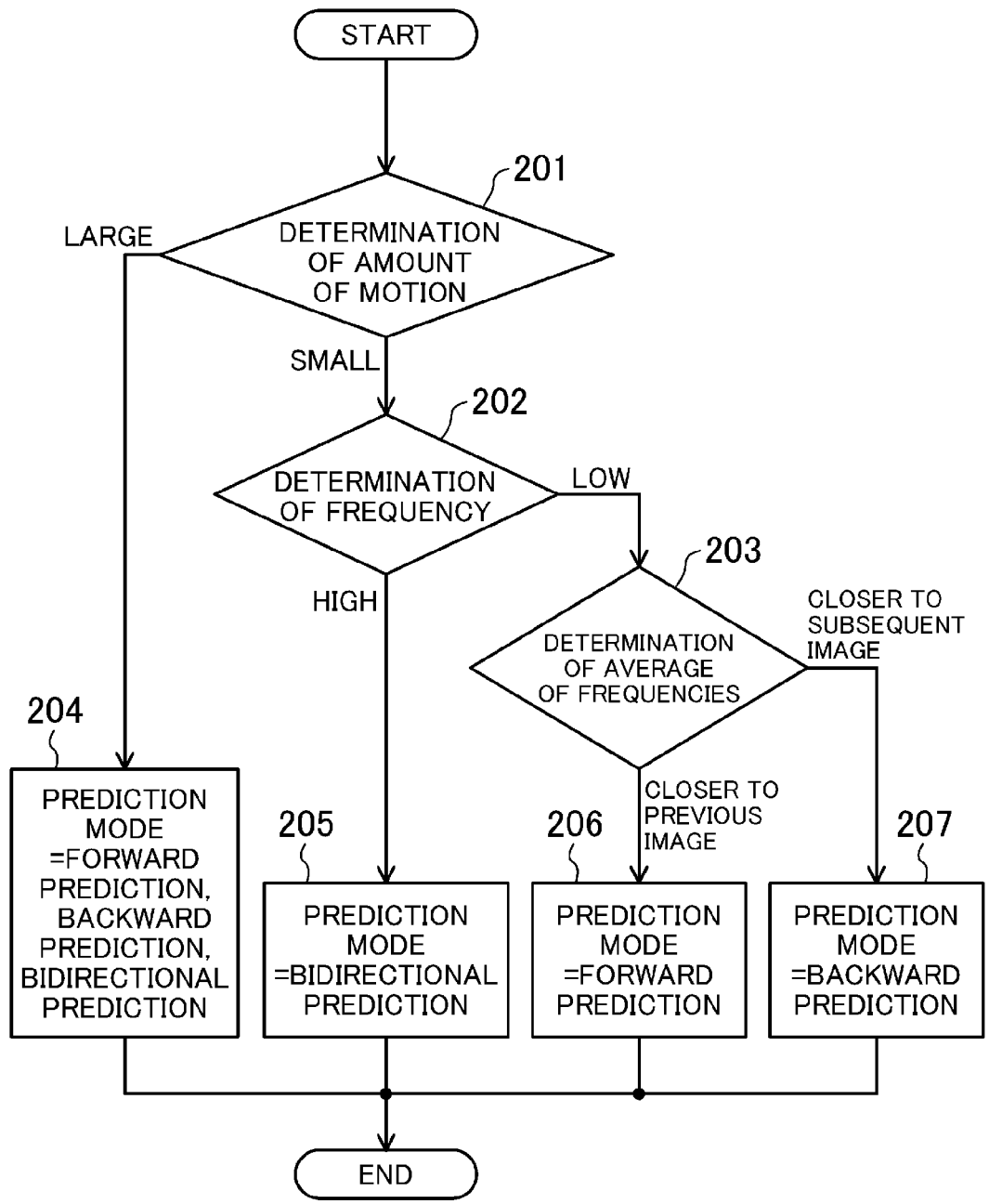
FIG. 2 is a flow chart illustrating the operation of a compression processor and a compression controller according to the first embodiment.

Next, detailed operation of the compression processor 110 and the compression controller 111 will be described step by step with reference to FIG. 2. The operation is performed on an image compressed as an image encoded in bidirectional prediction (a picture with reference to a previous and subsequent frame). The operation in FIG. 2 is performed on each frame. That is, the reference image is selected on each frame. The control of the reference image is not changed from the start to the end of encoding for one frame.

In step 201, the scene determiner 113 determines whether or not the amount of motion obtained by the motion detector 108 is equal to or larger than a predetermined value. Where the amount of motion is equal to or larger than the predetermined value, the scene determiner 113 determines not to allow the image difference determiner 114 to perform prediction mode selection. Where the amount of motion is equal to or larger than the predetermined value, the process proceeds to step 204. Where the amount of motion is smaller than the predetermined value, the process proceeds to step 202.

In step 202, the image difference determiner 114 reads the spatial frequencies obtained by the frequency detector 109, and determines whether or not the average of the spatial frequencies in the frequency detection ranges is equal to or greater than a predetermined value. Where the average is equal to or greater than the predetermined value, the process proceeds to step 205. Where the average is less than the predetermined value, the process proceeds to step 203.

In step 203, the image difference determiner 114 selects one of the previous image or the subsequent image of an image to be encoded in this embodiment, of which the average of the spatial frequencies in the frequency detection ranges is closer to that of the image to be encoded. Where the previous image is selected, the process proceeds to step 206. Where the subsequent image is selected, the process proceeds to step 207.

In step 204, the compression controller 111 controls the compression processor 110 to perform encoding using all the prediction modes of the forward prediction, the backward prediction, and the bidirectional prediction. In accordance with this control, the compression processor 110 performs the encoding. At this time, the previous image and the subsequent image need to be input to the compression processor 110.

In step 205, the compression controller 111 controls the compression processor 110 to perform encoding using both the previous image and the subsequent image as the reference images. That is, the compression controller 111 controls the compression processor 110 to perform the encoding using the bidirectional prediction. In accordance with this control, the compression processor 110 performs the encoding, and determines the most efficient prediction mode (i.e., the prediction mode which provides the least information amount of data by the encoding). The compression processor 110 outputs data obtained by the encoding using the prediction mode as encoded data. At this time, the previous image and the subsequent image need to be input to the compression processor 110. For decoding the image encoded in this manner, only one of the reference images is needed, which is selected based on the difference between the image to be decoded and the reference image determined by the compression controller 111. This reduces the number of memory access in the decoding.

In step 206, the compression controller 111 controls the compression processor 110 to perform encoding using only the previous image as the reference image. That is, the compression controller 111 controls the compression processor 110 to perform the encoding using the forward prediction. In accordance with this control, the compression processor 110 performs the encoding. At this time, the previous image needs to be input to the compression processor 110. For decoding the image encoded in this manner, only the previous image is needed. This reduces the number of memory access in both the encoding and the decoding.

In step 207, the compression controller 111 controls the compression processor 110 to perform encoding using only the subsequent image as the reference image. That is, the compression controller 111 controls the compression processor 110 to perform the encoding using the backward prediction. In accordance with this control, the compression processor 110 performs the encoding. At this time, the subsequent image needs to be input to the compression processor 110. For decoding the image encoded in this manner, only the subsequent image is needed. This reduces the number of memory access in both the encoding and the decoding.

In this embodiment, where the amount of motion in the image is small and the spatial frequencies are low, one of the reference images is referenced in encoding. This reduces the number of memory access in the encoding and decoding, thereby reducing power consumption. In addition, where the amount of motion in the image is small and the spatial frequencies are low, image quality is less influenced by the reduction in the reference images, thereby reducing deterioration in the image quality.

First Variation of First Embodiment

Figure 3:
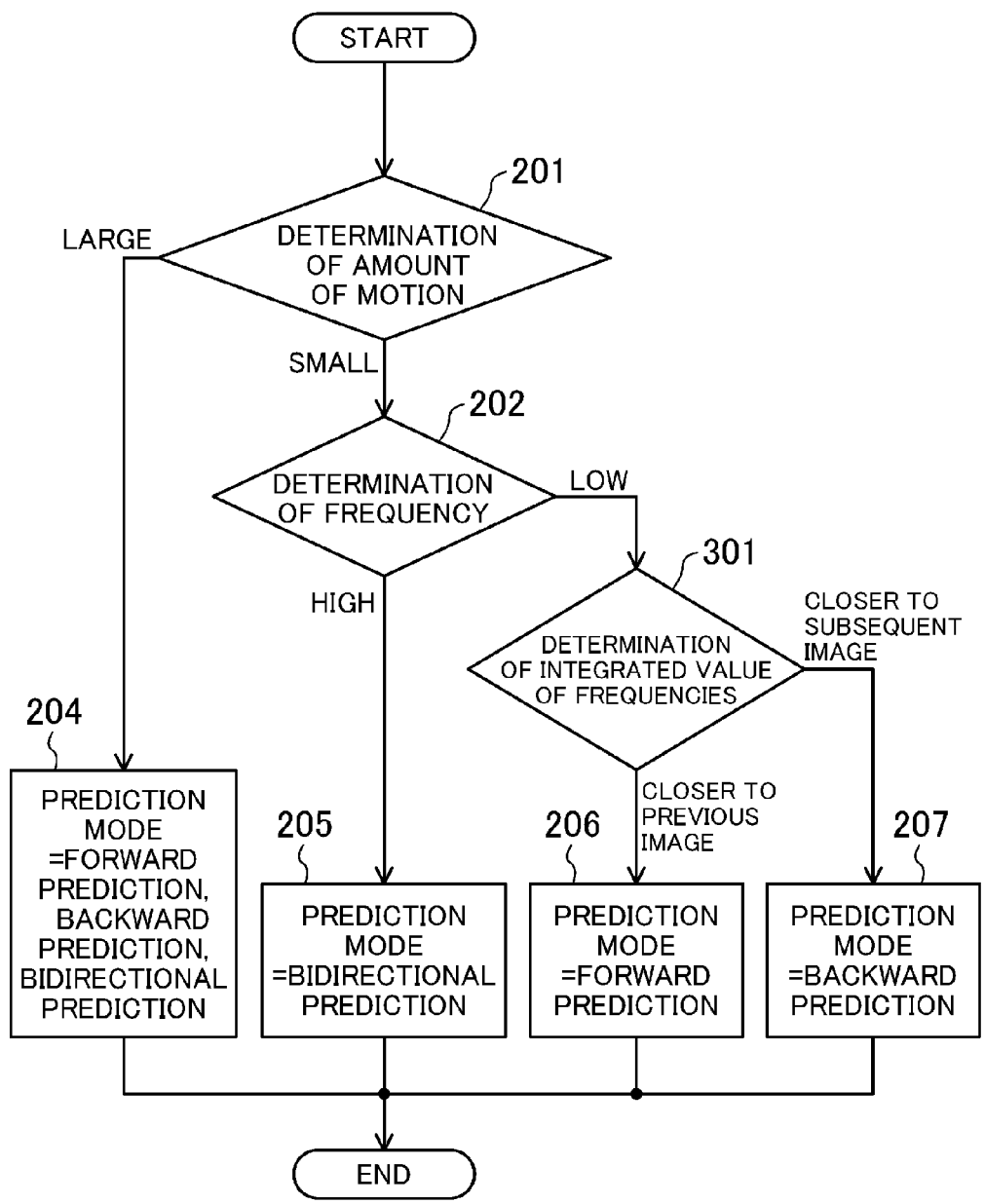
FIG. 3 is a flow chart illustrating the operation of a compression processor and a compression controller according to a first variation of the first embodiment.

In a camera system 100 according to a first variation of the first embodiment, a compression processor 110 and a compression controller 111 execute operation shown in FIG. 3 in place of the operation shown in FIG. 2. As shown in the figure, in this variation, the compression controller 111 executes operation of step 301 in place of step 203.

In step 301, an image difference determiner 114 selects one of the previous image or the subsequent image of an image to be encoded in this variation, of which the integrated value of spatial frequencies in a plurality of frequency detection ranges is closer to that of the image to be encoded. Where the previous image is selected, the process proceeds to step 206. Where the subsequent image is selected, the process proceeds to step 207.

Since the other configurations and operation are the same as those in the first embodiment, the same reference characters are used to represent equivalent operation in FIG. 3, and the explanation thereof is omitted.

Second Variation of First Embodiment

Figure 4:
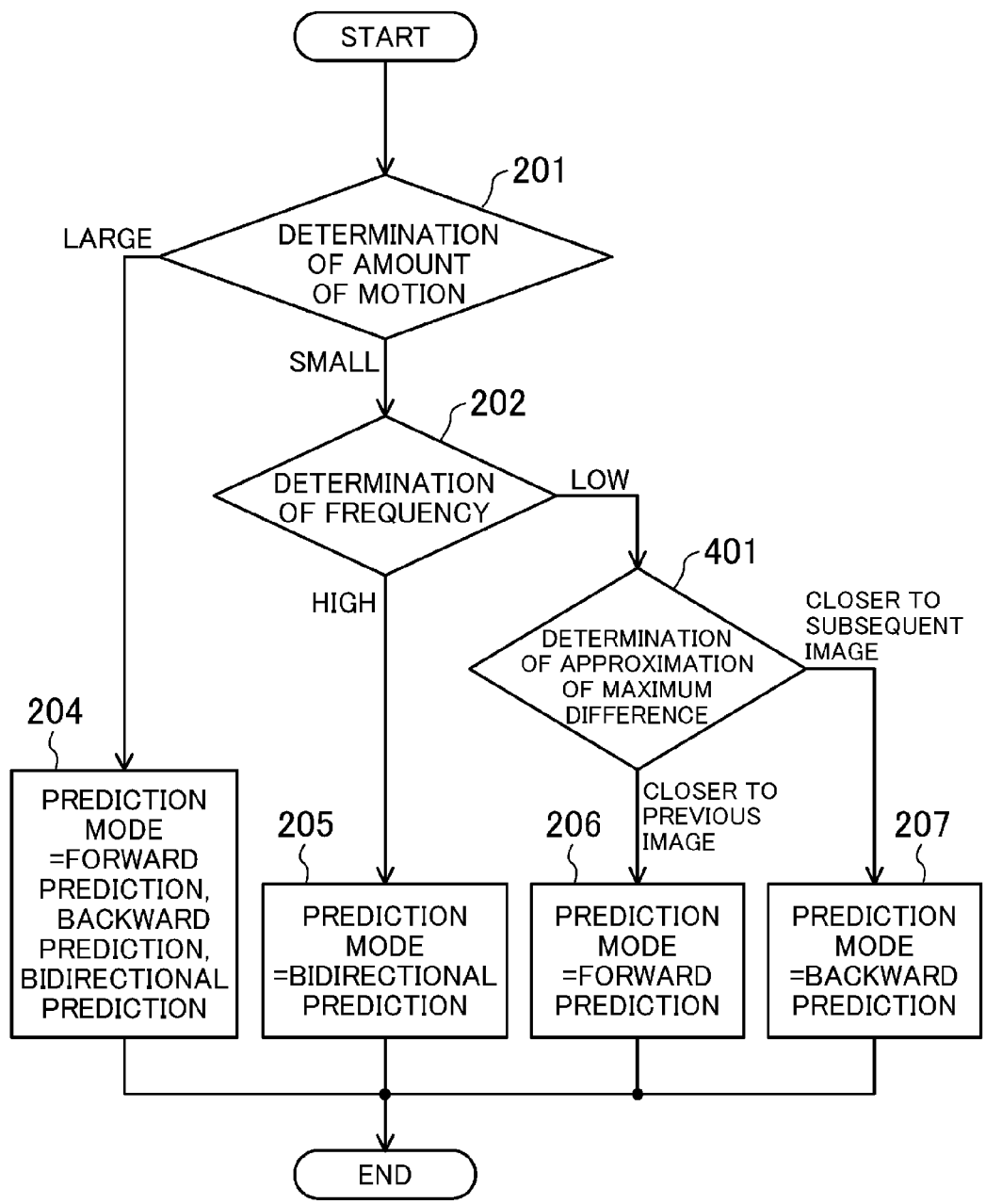
FIG. 4 is a flow chart illustrating the operation of a compression processor and a compression controller according to a second variation of the first embodiment.

In a camera system 100 according to a second variation of the first embodiment, a compression processor 110 and a compression controller 111 execute operation shown in FIG. 4 in place of the operation shown in FIG. 2. As shown in the figure, in this variation, the compression controller 111 executes operation of step 401 in place of step 203.

In step 401, an image difference determiner 114 selects one of the previous image or the subsequent image of an image to be encoded in this variation, which has a smaller maximum difference in spatial frequencies in a plurality of frequency detection ranges from that of the image to be encoded. Where the previous image is selected, the process proceeds to step 206. Where the subsequent image is selected, the process proceeds to step 207.

Since the other configurations and operation are the same as those in the first embodiment, the same reference characters are used to represent equivalent operation in FIG. 4, and the explanation thereof is omitted.

Third Variation of First Embodiment

Figure 5:
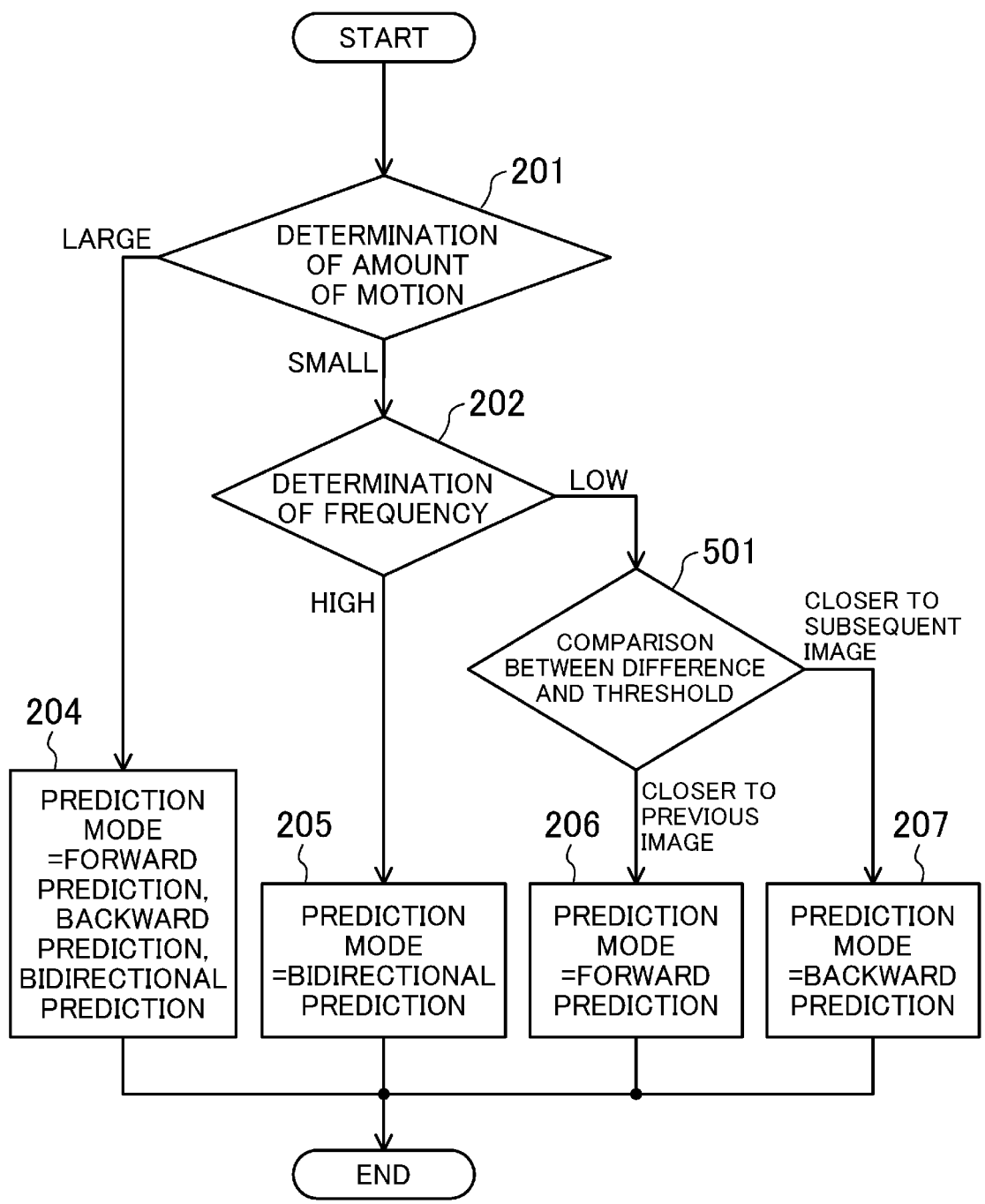
FIG. 5 is a flow chart illustrating the operation of a compression processor and a compression controller according to a third variation of the first embodiment.

In a camera system 100 according to a third variation of the first embodiment, a compression processor 110 and a compression controller 111 execute operation shown in FIG. 5 in place of the operation shown in FIG. 2. As shown in the figure, in this variation, the compression controller 111 executes operation of step 501 in place of step 203.

In step 501, the image difference determiner 114 selects the one of the previous image or the subsequent image of an image to be encoded in this variation, which has more frequency detection ranges, in which spatial frequencies having greater differences from spatial frequencies of the image to be encoded than a predetermined threshold are detected. Where the previous image is selected, the process proceeds to step 206. Where the subsequent image is selected, the process proceeds to step 207.

Since the other configurations and operation are the same as those in the first embodiment, the same reference characters are used to represent equivalent operation in FIG. 5, and the explanation thereof is omitted.

Second Embodiment

Figure 6:
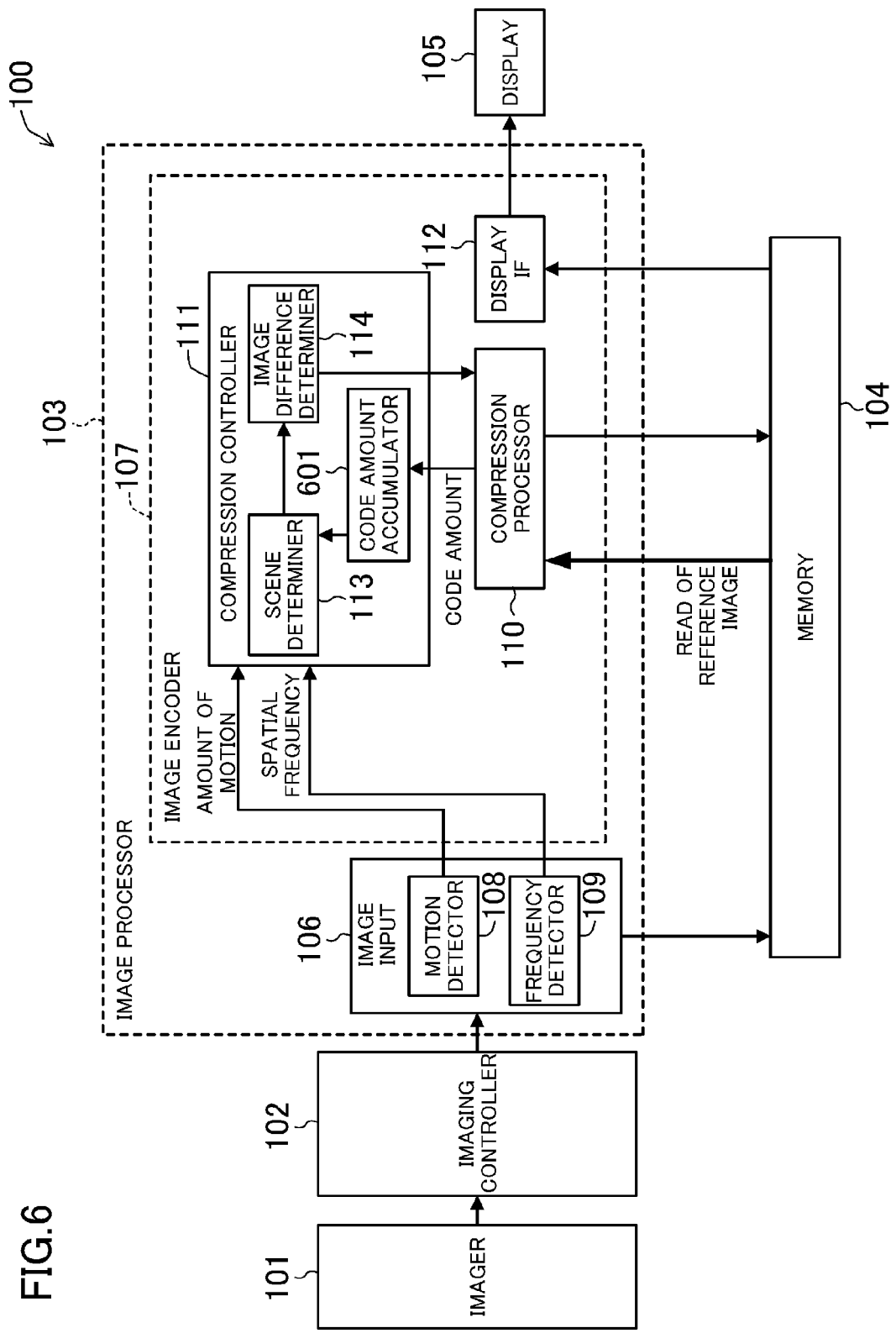
FIG. 6 is a block diagram illustrating the configuration of a camera system according to a second embodiment.

In a camera system 100 according to a second embodiment of the present disclosure, as shown in FIG. 6, a compression controller 111 includes a code amount accumulator 601 in addition to a scene determiner 113 and an image difference determiner 114. The code amount accumulator 601 accumulates a code amount obtained by encoding of a compression processor 110.

Figure 7:
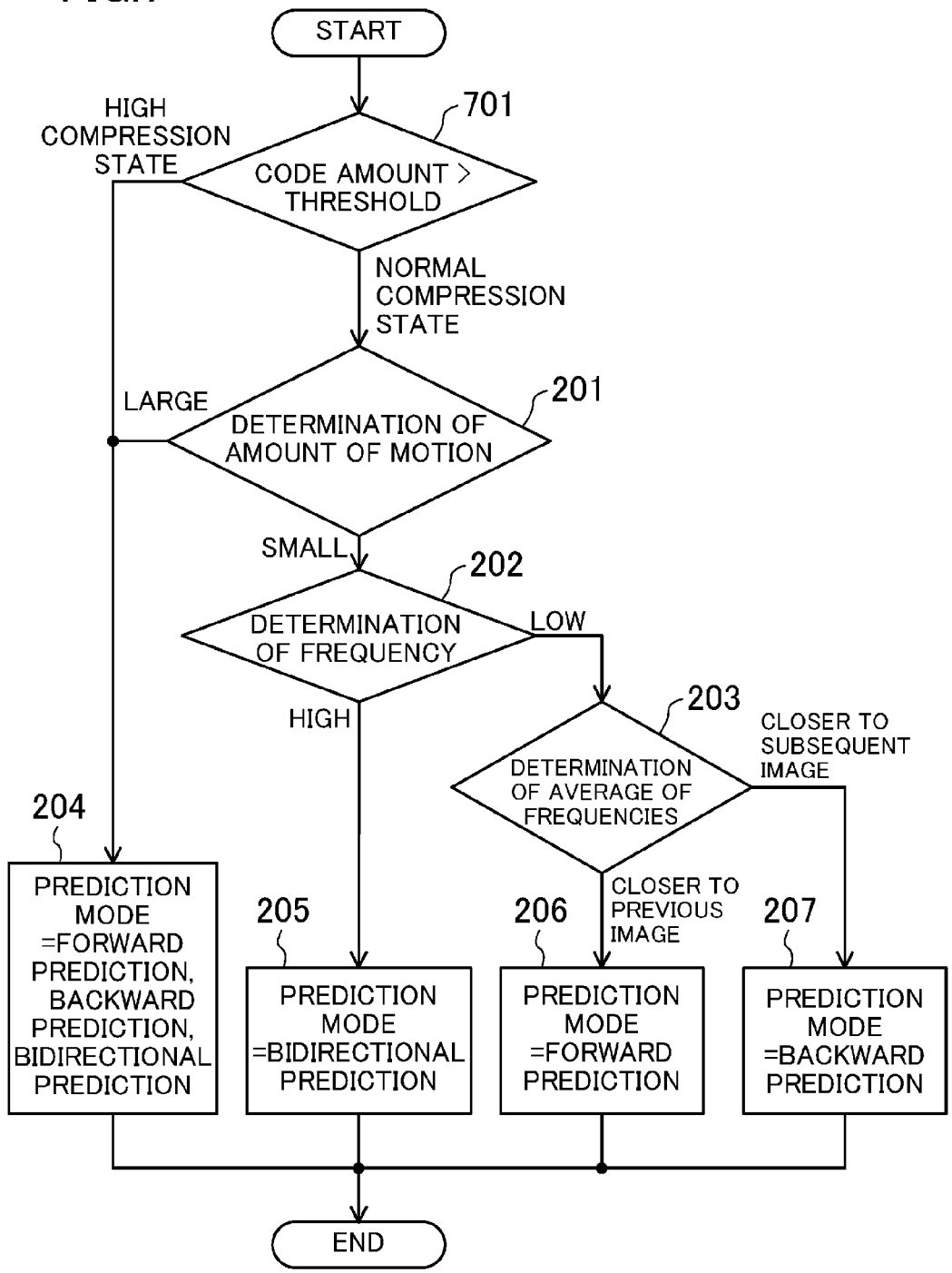
FIG. 7 is a flow chart illustrating the operation of a compression processor and a compression controller according to the second embodiment.

In the camera system 100 according to the second embodiment, the compression processor 110 and the compression controller 111 execute operation shown in FIG. 7 in place of the operation shown in FIG. 2. As shown in the figure, in the second embodiment, the compression controller 111 executes operation of step 701 before step 201.

In step 701, the scene determiner 113 determines whether or not the code amount accumulated in the code amount accumulator 601 is larger than a predetermined threshold. Where the code amount is larger than the predetermined threshold, the scene determiner 113 determines that the image is in a high compression state. Where the code amount is not larger than the predetermined threshold, the scene determiner 113 determines that the image is in a normal compression state. Where the image is determined as being in the high compression state, the process proceeds to step 204. Where the image is determined as being in the normal compression state, the process proceeds to step 201.

The threshold used in the determination of step 701 may be a fixed value, or may be controlled based on the bit rate of a target system. The threshold may be controlled to be high when the bit rate is high, and low when the bit rate is low, thereby efficiently selecting a reference image.

Since the other configurations and operation are the same as those in the first embodiment, the same reference characters are used to represent equivalent configurations and operation in FIGS. 6 and 7, and the explanation thereof is omitted.

According to the second embodiment, deterioration in image quality caused in a high compression state can be controlled, and the number of memory access in encoding and decoding can be reduced, thereby reducing power consumption.

First Variation of Second Embodiment

Figure 8:
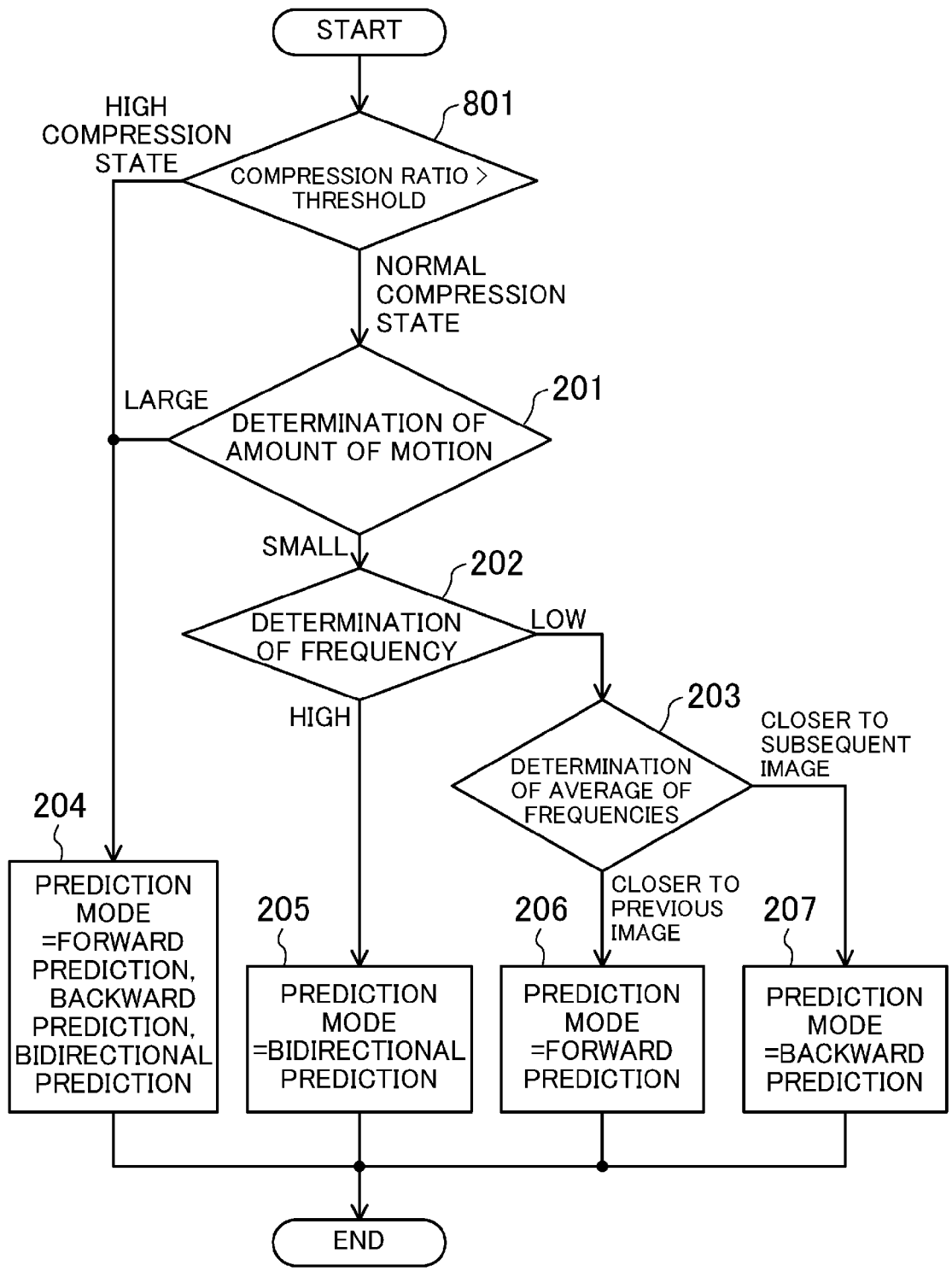
FIG. 8 is a flow chart illustrating the operation of a compression processor and a compression controller according to a first variation of the second embodiment.

In a camera system 100 according to a first variation of the second embodiment, a compression processor 110 and a compression controller 111 execute operation shown in FIG. 8 in place of the operation shown in FIG. 7. As shown in the figure, in this variation, the compression controller 111 executes operation of step 801 in place of step 701.

In step 801, a scene determiner 113 determines whether or not a compression ratio used in encoding by the compression processor 110 is lower than a predetermined threshold. Where the ratio is lower than the threshold, the scene determiner 113 determines that an image is in a high compression state. Where the ratio is not lower than the threshold, the scene determiner 113 determines that the image is in a normal compression state. Where the image is determined as being in the high compression state, the process proceeds to step 204.

Where the image is determined as being in the normal compression state, the process proceeds to step 201.

Similar to the second embodiment, the threshold used in the determination of step 801 may be a fixed value, or may be controlled based on the bit rate of a target system.

Since the other configurations and operation are the same as those in the second embodiment, the same reference characters are used to represent equivalent operation in FIG. 8, and the explanation thereof is omitted.

Second Variation of Second Embodiment

In a camera system 100 according to a second variation of the second embodiment, a compression processor 110 and a compression controller 111 execute operation shown in FIG. 9 in place of the operation shown in FIG. 7. As shown in the figure, in this variation, the compression controller 111 executes operation of step 901 in place of step 701.

In step 901, a scene determiner 113 determines whether or not a bit rate of encoding by the compression processor 110 is higher than a predetermined threshold. Where the rate is higher than the threshold, the scene determiner 113 determines that an image is in a high compression state. Where the rate is not higher than the threshold, the scene determiner 113 determines that the image is in a normal compression state. Where the image is determined as being in the high compression state, the process proceeds to step 204. Where the image is determined as being in the normal compression state, the process proceeds to step 201.

Since the other configurations and operation are the same as those in the second embodiment, the same reference characters are used to represent equivalent operation in FIG. 9, and the explanation thereof is omitted.

Third Embodiment

In a camera system 100 according to a third embodiment, a compression processor 110 and a compression controller 111 execute operation shown in FIG. 10 in place of the operation shown in FIG. 7. As shown in the figure, in the third embodiment, in step 701, where a code amount accumulated in a code amount accumulator 601 is determined as being not larger than a predetermined threshold, the process proceeds to step 1001.

In step 1001, the compression controller 111 determines whether or not the code amount accumulated in the code amount accumulator 601 is smaller than a predetermined threshold. Where the code amount is smaller than the predetermined threshold, the compression controller 111 determines that the image is in a low compression state. Where the code amount is not smaller than the predetermined threshold, the compression controller 111 determines that the image is in a normal compression state. Where the image is determined as being in the low compression state, the process proceeds to step 203. Where the image is determined as being in the normal compression state, the process proceeds to step 201.

Since the other configurations and operation are the same as those in the second embodiment, the same reference characters are used to represent equivalent operation in FIG. 10, and the explanation thereof is omitted.

According to the third embodiment, one of the previous image or the subsequent image is selected as a reference image when the image is in a low compression state in which the amount of the decoded data less influences deterioration in image quality. This efficiently reduces the number of memory access in encoding and decoding. Therefore, deterioration in the image quality can be controlled, and power consumption can be efficiently controlled.

In the first to third embodiments and their variations, the selection of the reference image by the compression controller 111 (i.e., the determination by the scene determiner 113) is performed on each frame. However, it may be performed in each divided region such as a macro block, forming part of a frame. This enables highly precise selection of the reference image.

In the first to third embodiments and their variations, in step 201, whether or not the prediction mode selection is performed based on the amount of motion obtained by the motion detector 108. The determination may be made based on angular velocity information obtained by a lens controller (not shown) or the motion vector of the image, which is an image immediately before than the image to be encoded and is obtained by the compression processor 110. The determination may be made based on two or all of the amount of motion obtained by the motion detector 108, the angular velocity information, and the motion vector. Where the motion vector obtained by the compression processor 110 is used for the determination on whether or not to perform prediction mode selection, determination in each macro block is facilitated.

The information (e.g., an angular velocity of a camera, a motion vector (i.e., image motion information), spatial frequencies, etc.) used in a conventional camera may be used for the prediction mode selection, or the determination on whether or not to perform the prediction mode selection, thereby mitigating an increase in the number of processing.

The compression information (e.g., the code amount, the bit rate, etc.) obtained in the encoding may be used for the prediction mode selection, or the determination on whether or not to perform the prediction mode selection, thereby selecting the most preferable prediction mode according to rate control in a normal mode of taking a moving image.

In the first to third embodiments and their variations, in step 202, which of step 205 and step 203 the process proceeds to is determined based on whether or not the average of the spatial frequencies in the frequency detection ranges is equal to or greater than the predetermined value. However, the determination may be made based on whether the number of the spatial frequencies higher than a predetermined threshold is equal to or larger than a predetermined number in the frequency detection ranges. Where the selection of the reference image by the compression controller 111 (the determination by the scene determiner 113) is performed in each frequency detection range (i.e., divided region), the determination may be made based on whether or not the spatial frequency in the frequency detection range is equal to or higher than a predetermined value.

The present disclosure is applicable to encoding systems other than a system according to the MPEG standards, which use bidirectional prediction.

The present disclosure is useful as an image encoder encoding a moving image, and a camera system including the image encoder.

What is claimed is:

1. An image encoder encoding a moving image, the encoder comprising:

a compression processor configured to encode brightness data and color-difference data of an image to be encoded, and to output the encoded data; and a compression controller configured to execute prediction mode selection for selecting any one of forward prediction, backward prediction, or bidirectional prediction as a prediction mode used for the encoding based on spatial frequencies of the image to be encoded, and configured to perform scene determination for determining whether or not to execute the prediction mode selection based on image mobility information indicating an amount of motion in the image to be encoded.

2. The image encoder of claim 1, wherein the image mobility information includes pixel mobility information obtained by representative matching.

3. The image encoder of claim 1, wherein
the image encoder is mounted in a camera, and
the image mobility information includes angular velocity information of the camera.

4. The image encoder of claim 1, wherein the image mobility information includes a motion vector obtained for an image which is an image immediately before than the image to be encoded.

5. The image encoder of claim 1, wherein the image mobility information includes at least two of pixel motion information obtained by representative matching, angular velocity information, and a motion vector obtained for an image which is an image immediately before than the image to be encoded.

6. The image encoder of claim 1, wherein in the prediction mode selection, when either one of forward prediction or backward prediction is selected as a mode of the encoding, an average of spatial frequencies in a plurality of frequency detection ranges of a reference image of the selected one is closer to that of the image to be encoded.

7. The image encoder of claim 1, wherein in the prediction mode selection, when either one of forward prediction or backward prediction is selected as a mode of the encoding, an integrated value of spatial frequencies in a plurality of frequency detection ranges of a reference image of the selected one is closer to that of the image to be encoded.

8. The image encoder of claim 1, wherein in the prediction mode selection, when either one of forward prediction or backward prediction is selected as a mode of the encoding, the selected one has a smaller maximum difference in spatial frequencies in a plurality of frequency detection ranges between a reference image and the image to be encoded.

9. The image encoder of claim 1, wherein in the prediction mode selection, when either one of forward prediction or backward prediction is selected as a mode of the encoding, the selected one has more frequency detection ranges of a reference image, in which spatial frequencies having greater differences from the spatial frequencies of the image to be encoded than a threshold are detected.

10. The image encoder of claim 1, wherein in the scene determination, whether or not to execute the prediction mode selection is determined based on a compression state criterion value indicating a code amount of the image, in addition to the image mobility information.

11. The image encoder of claim 1, wherein in the scene determination, whether or not to execute the prediction mode selection is determined based on a compression state criterion value indicating a compression ratio in the encoding, in addition to the image mobility information.

12. The image encoder of claim 1, wherein in the scene determination, whether or not to execute the prediction mode selection is determined based on a compression state criterion value indicating a bit rate of the encoding, in addition to the image mobility information.

13. The image encoder of claim 10, wherein in the scene determination,
whether or not the compression state criterion value is greater than a first threshold is determined in first determination, and
whether or not to execute the prediction mode selection is determined based on a result of the first determination.

14. The image encoder of claim 13, wherein in the scene determination,
whether or not the compression state criterion value is smaller than a second threshold is determined in second determination, and
whether or not to execute the prediction mode selection is determined based a result of the second determination.

15. The image encoder of claim 1, wherein the scene determination is made on each frame by the compression controller.

16. The image encoder of claim 1, wherein the scene determination is made in each divided region forming part of a frame by the compression controller.

17. A camera system comprising:
the image encoder of claim 1;
an imager configured to convert image light to an electrical signal using an imaging element;
an imaging controller configured to control timing of capturing the electrical signal obtained by the imaging element and a time for irradiating the imaging element with image light, to perform analog-to-digital conversion of the electrical signal, and to output the converted signal as an image signal;
an image input configured to generate brightness data and color-difference data based on the image signal output from the imaging controller;
a memory configured to temporarily store the encoded data output from the compression processor of the image encoder; and
a display configured to display an image based on the brightness data and the color-difference data generated by the image input of the image encoder.

* * * * *